Sept. 1, 1964 R. H. REISS, SR., ETAL 3,146,502
GLASS AND PANEL RETAINING BUTTON
Filed Sept. 5, 1962
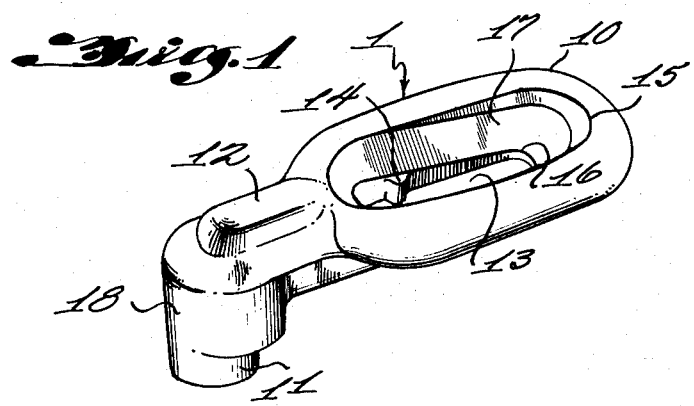
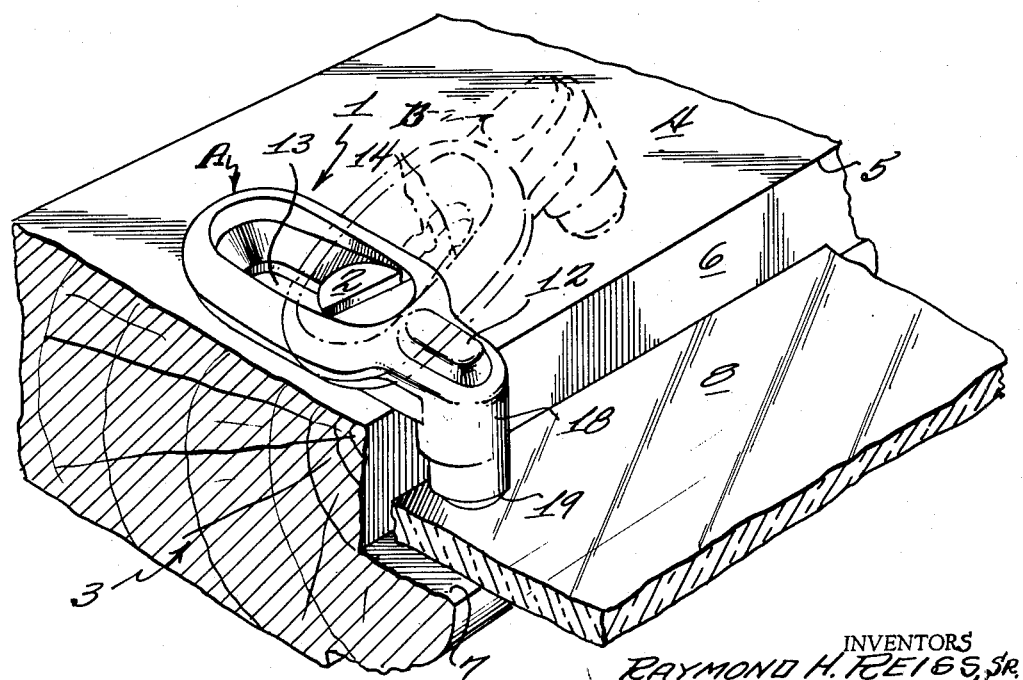
INVENTORS
RAYMOND H. REISS, SR.
PAUL R. T. HAHN
By Cushman, Darby & Cushman
ATTORNEYS

3,146,502
GLASS AND PANEL RETAINING BUTTON
Raymond H. Reiss, Sr., Deal, and Paul R. T. Hahn, Westfield, N.J., assignors to Ronthor Reiss Corporation, New York, N.Y., a corporation of Delaware
Filed Sept. 5, 1962, Ser. No. 221,534
9 Claims. (Cl. 20—56.1)

The present invention relates to a novel releasable fastening device for releasably fastening removable panel members within suitable frames, sashes and other doors, windows and display devices. More particularly, the present invention relates to a flexible plastic fastening device which is adapted to detachably secure panel members to outer supporting and decorative frame elements. Specifically, the present invention is directed to the mounting and use of a novel plastic fastening device for glass and panels recessed in frame elements.

In the past there have been many such devices, all of which have suffered from various disadvantages. Several among them require the use of special tools and special skills for installation and operation. Others offer no provision for accommodating and fastening more than a single size of panel and frame members while still others which may accommodate a variety of panel and frame sizes tend to cut and damage the panel members upon engagement therewith. For the most part, fastening devices of the prior art have been of a relatively flimsy construction that is easily damaged with any degree of rough handling.

With the conventional method of removably securing glass, pictures and backing members in picture frames, for example, nails, screws or tacks are driven into the frame and after being removed or replaced several times, the openings in which they are positioned become worn to such an extent that it is difficult to retain the desired parts within the frame.

To overcome the above-mentioned difficulties, the present invention contemplates replacing nails and the like with a conventional wood screw and a small plastic fastening device that exhibits a camming or wedging action when pressed into contact with the head of the screw. When using the fastening device of this invention, it is only necessary to press the fastening device into camming contact with the head of a wood screw to secure the desired elements within a suitable frame member.

Accordingly, it is an object of this invention to provide a releasable fastening device that is not subject to the disadvantages attendant to fastening devices of the prior art.

It is another object of this invention to provide a releasable fastening device for fastening a removable panel to a frame.

It is still another object of this invention to provide a releasable fastening device comprising, in combination, a securing member affixed to a frame and a flexible plastic fastening component surrounding the head portion of said securing member and being located in sliding frictional contact therewith, said fastening component being provided with a pressure member for engaging said removable panel member and camming means for coacting with said head portion of said screw-like member to cam the said pressure member into rigid contact with said removable panel member.

Another object of this invention is to provide a releasable fastening device that is adapted for use with panels and frame members now in use.

A further object of the invention is to provide a releasable fastening device that is adapted to securely fasten panel members within frame members of a variety of different sizes.

It is still a further object of this invention to provide a releasable fastening device for fastening a removable panel to a frame comprising in combination, a securing member having a head portion and a flexible plastic fastening component having a flexible housing in surrounding relationship to said head portion and being located in sliding frictional contact therewith, said fastening component being provided with a cylindrically shaped pressure member for engaging said removable panel member, said housing containing an elongated oval-shaped slot for receiving said securing member and said housing containing an oval-shaped inclined plane for coacting and camming with said head portion of said securing member to cam the said pressure member into rigid contact with said removable panel member, said housing also containing locking means for retaining said fastening component in a rigid camming relationship with said securing member.

Other objects and advantages of this invention will become more fully apparent with reference to the following disclosure and the appended claims.

In the drawing similar reference characters have been employed to designate corresponding parts throughout the several views.

FIGURE 1 is a pictorial view of the device of this invention.

FIGURE 2 is a fragmentary perspective view showing the operation of the device of this invention.

Referring to the drawing, the numeral 1 generally indicates the plastic fastening device or "button" of this invention which may be affixed by means of a suitable screw-like securing member, such as wood screw 2, to a frame or wooden molding member indicated generally at 3 and having facing 4, edge 5, wall 6 and supporting ledge 7. A pane of glass or a suitable panel member 8 is held securely on supporting ledge 7 by means of the combined fastening and camming action of button 1 and screw 2 as explained more fully hereinbelow.

Turning now to FIGURE 1 of the drawing, the "button" or fastening device 1 of this invention is composed of an elongated oval-shaped housing 10 connected to a cylindrically-shaped head or pressure member 11 by means of arm 12. Housing member 10 is provided with a generally elongated oval-shaped opening 13 which is adapted to receive screw 2 and move in sliding frictional contact with the lower elements thereof.

The oval-shaped opening 13 is provided with at least one, and preferably two locking members, or knobs 14 which may be substantially semi-cylindrically shaped and face each other on opposite sides of opening 13. These locking knobs partially constrict the freedom of opening 13 and form a substantially circular or C-shaped configuration with the lefthand end thereof adjacent the pressure member 11. It is this C-shaped opening that tightly surrounds the base of screw 2 when button 1 is in fastening position A (see FIGURE 2). To accomplish a secure, reusable and readily releasable locking action, the axis of the semi-cylindrically shaped locking knobs 14 is in a plane perpendicular to the horizontal plane of the elongated opening 13.

Referring more particularly to the opening 13, it can be seen that the same is located within housing 10 and is provided with substantially vertical walls disposed within a generally larger elongated oval-shaped slot 15 which is generally parallel in all dimensions to the corresponding portions of opening 13. Housing 10 also contains an elongated recess in the form of an oval-shaped inclined plane having upwardly flaring walls 17 that terminate at their upper edges along the line of their intersection with slot 15. Walls 17 terminate at their lower edges along a line 16 formed by the vertical walls of opening 13. As shown, the angle of the elongated recess determines the height of the vertical walls of opening 13 and also determines the depth of the generally vertical walls of slot 15. Understandably, the angle of the inclined plane may be changed to provide any desired degree of frictional locking pressure or to prevent undesired wear of the button, etc.

The novel camming feature of this invention is provided by the combined action or coacting of (1) the angle of the inclined plane and (2) the shape of the upwardly flaring walls 17, in conjunction with (3) the underside or edge portions of the head of an ordinary wood screw. This camming action is "locked" or retained as long as desired by the locking action that at least one of the knobs 14 has against the substantially cylindrical lower portion of an ordinary wood screw.

Returning now to the drawings, it may be seen that cylindrically-shaped pressure member 11 is composed of bevelled contact face 19 and rests on a cylindrically shaped support 18, offset and adjacent from the axis thereof, the axes of both member 11 and support 18 being perpendicular to the plane of housing 10 and opening 13. The combined length or height of support 18 and member 11 may be made to accommodate any desired depth of wall 6 combined with the thickness of panel 8. Further, the combined height of support 18 and member 11 should be sufficient to exert at least some pressure on panel 8 when button 1 is placed in camming coaction with securing member 2. Obviously, this combined height may be varied to produce any desired pressure, or lack of it, on panel 8. Due to the flexibility of button 1, this combined height does not have to be ascertained with any high degree of accuracy. Obviously also, the same button may secure a variety of different panel thicknesses due to the inherent button flexibility and due to the fact that securing member 2 can be adjusted in height.

In order to make the fastening device of this invention "operative," it is only necessary to place plastic button 1 (see FIGURE 2) in one plane at any angle of orientation, such as in position A on facing 4, and insert a wood screw 2 within the substantially C-shaped openings provided by one or more knobs 14. The wood screw is then driven down so that the head is slightly below the level of the plastic button, and in this position, the clearance space below the head of the wood screw is sufficient to allow the plastic button freedom to lift up over the edges of the wooden molding 3. The wood screws do not have to be tightened or loosened for normal operation of the button after the initial installation as the narrowed position of the slot, at knobs 14, securely holds the plastic button in the locked position. The button will then be secured in sliding frictional contact with the head of wood screw 2. Obviously, screw 2 may be loosened to permit the button 1 to accommodate a thicker panel member 8, or a plurality of such panel members. Similarly, screw 2 may be tightened to accommodate thinner panel members, or to exert more pressure on panel member 8 by means of pressure member 11 and flexible arm 12.

The button may be released by thumb pressure against the end of housing 10 furthest removed from screw 2. Alternatively, the button may be released by a pulling and twisting action of the thumb and index finger on cylindrical pressure member 11. The glass or panel member 8 may then be released by twisting and lifting the button from position A up over edge 5 to any other plane generally denoted by position B.

To lock the panel 8 in position on supporting ledge 7, the button may be twisted or rotated from position B on the edge of molding 3 and pushed or firmly pressed back towards screw 2 to snap the button into locking position A. It is readily obvious that button 1 may be secured into, and turned away into, any desired position, a feature that greatly adds to the maneuverability and utility of the releasable fastening device of this invention.

It is well to point out at this time that the button does not have to be formed from "plastic" in the usual sense of thermoplastic and thermosetting resinous materials, but may be formed from any woods, metals, ceramics, glasses or other flexible materials or mixtures thereof that are provided with sufficient resiliency to permit at least one knob 14 to pass in sliding frictional contact with the base of screw 2 by means of the flexible or "flexing" action contained in member 10. The button may be formed from any natural or synthetic resins and rubbers having high impact strength including synthetic resins selected from the group consisting of polyamide, polyester, polyurethane, polymerized halogenated olefins, polyolefin, polyvinyl, polyacrylic; cellulose esters and ethers; urea-, melamine-, and phenol-formaldehyde types; and include various derivatives and copolymers of all these materials as well as physical and chemical mixtures thereof. It is only necessary that the material employed can be formed by a suitable shaping, forming, molding, casting, stamping or forging procedure, and that the resultant product be sufficiently simple, economical and relatively sturdy of construction.

The preferred material of construction now being used for the button of this invention is linear polyethylene. Linear polyethylene exhibits good lubricity and slides easily over most frame and panel surfaces without marking, adjusts itself to varying pressures exerted by the head of the securing member and will not crack if subjected to excessive pressures.

Linear polyethylene, and any of the other materials of construction may remain in their "native" clear, transparent, translucent or opaque state or they may be colored in any manner that is understood in the art. For example, the buttons may be dyed, pigmented, painted, enameled or coated with any desirable material.

It is within the contemplation of this disclosure that the securing members, panel members, frame members or button of this invention should not be limited or restricted to any particular size or dimensions. It is only necessary that sufficient coaction be maintained between the camming, locking and pressure members of this button to permit the releasable fastening action desired. For example, the length of arm 12 may be changed to increase or decrease the flexibility of the button and the pressure that it exerts on panel member 8. Alternatively, housing 10 may be shortened or lengthened to change the slope of the inclined plane to correspond with the requirements of any material of construction employed.

Moreover, it is not required that the fastening device of this invention be secured to a wooden frame or molding member 3 with a wood screw 2. It is to be understood that the button 1 may be secured to any metal, plastic, wood, glass, ceramic or the like materials of construction by means of any securing member, metal screw, wood screw, nail, bolt, rivet or other fastening device that is provided with a suitable "head" that may be placed into sliding frictional contact and exert a camming action with the walls 17 of the inclined plane. It is also desired that the head or pressure member 11 be adapted to releasably fasten any panel or the like member of any size whether constructed of metal, glass, ceramic, wood, paper, textile, plastic or combination or constructional materials known in the art.

Further, it is not intended that the outward design of the button of this invention be limited to the smooth contours illustrated in the drawing, but may be formed with any desired circular, spherical, square, rectangular, triangular or other polygonal shape or curved surface. For example, the "knob" shown in the drawings, above arm 12, does not have to be employed but has been used in the preferred embodiment of this invention to permit a better finger hold on the button when it is being turned, as well as to act as a strengthening rib for arm 12. This knob may, therefore, take any shape that is desired by those skilled in the art.

The removable fastening device of this invention is suitable for use in securing any desired structural, useful or decorative panel member within any shape frame, opening or closure that may be used for picture frames, furniture, windows, door panels or wall members and the like. For example, a panel member may be constructed of wood covered with wicker or textile decorative material and be releasably or interchangeably secured at any angle of inclination in a cabinet or like piece of furniture with one or more of the buttons of this invention. Alternatively, one or more of the buttons of this invention may be used to secure a pane of glass in the door of a cabinet suitable for displaying china and crystalware.

While the above disclosure illustrates and describes a preferred embodiment of our invention, it will be understood that this is merely by way of illustration, and that various changes and modifications may be made therein within the contemplation of the invention without departing from the spirit and scope of the following claims.

What is claimed is:

1. A releasable fastening device for fastening a removable panel to a frame comprising, in combination, a securing member affixed to said frame, said securing member having a head portion, and a flexible plastic fastening component surrounding the head portion of said securing member and being located in sliding frictional contact therewith, said fastening component being provided with a pressure member for engaging said removable panel member and camming means, said camming means comprising an elongated slot containing an elongated and oval-shaped inclined plane on the surface of the flexible fastening component engaging said head portion of said securing member whereby said pressure member is cammed into rigid contact with said removable panel member by coaction between said head portion and said inclined plane.

2. A releasable fastening device as claimed in claim 1 wherein said flexible fastening component includes means for locking said pressure member in rigid contact with said removable panel member.

3. A plastic fastening component for a recessed panel member, said component having a flexible housing containing an elongated oval-shaped slot providing movable surrounding relationship with a fixed securing member, said flexible housing having a pressure member attached thereto for restraining relationship with the recessed panel member, said flexible housing containing an elongated recess provided with camming means for coacting with the fixed securing member to thereby cam the said pressure member into rigid contact with the recessed panel member.

4. A plastic fastening component for recessed panel members, said component having a flexible housing containing an elongated oval-shaped slot and containing an elongated recess with an oval-shaped inclined plane, said component being provided with a cylindrically-shaped pressure member connected to the housing and located adjacent to the said slot and having a longitudinal axis perpendicular to the longitudinal axis of the slot.

5. A fastening component as claimed in claim 4 wherein said elongated oval-shaped slot is provided with at least one semi-cylindrically shaped locking member which partially constricts the freedom of said slot.

6. A fastening component as claimed in claim 4 wherein said elongated oval-shaped slot is provided with a plurality of locking members having axes located in a plane perpendicular to the plane of said elongated slot.

7. A fastening component as claimed in claim 4 wherein said pressure member is located on a cross sectional plane of a cylindrical support member, the axis of said pressure member being located adjacent to the axis of said support member.

8. A fastening component as claimed in claim 4 wherein the flexible housing surrounding said oval-shaped slot is connected to said pressure member by means of a flexible arm.

9. A releasable fastening device for fastening a removable panel to a frame comprising in combination, a securing member having a head portion and a flexible plastic fastening component having a flexible housing in surrounding relationship to said head portion and being located in sliding frictional contact therewith, said fastening component being provided with a cylindrically shaped pressure member connected to the housing for engaging said removable panel member, said housing containing an elongated oval-shaped slot for receiving said securing member and said housing containing an elongated recess with an oval-shaped inclined plane for coacting and camming with said head portion of said securing member to cam the said pressure member into rigid contact with said removable panel member, said housing also containing locking means for retaining said fastening component in a rigid camming relationship with said securing member.

References Cited in the file of this patent
UNITED STATES PATENTS

| | | |
|---|---|---|
| 1,059,764 | Ringer | Apr. 22, 1913 |
| 1,846,366 | Shattuck | Feb. 23, 1932 |
| 2,733,492 | Copell | Feb. 7, 1956 |